June 7, 1938.   M. H. LOUGHRIDGE   2,119,550
SPEED CONTROL AND BRAKING SYSTEM
Filed July 19, 1934   5 Sheets-Sheet 4
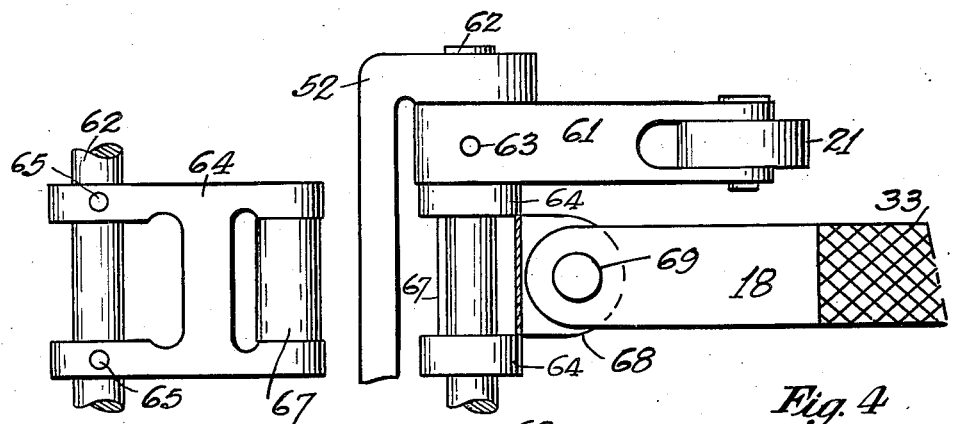
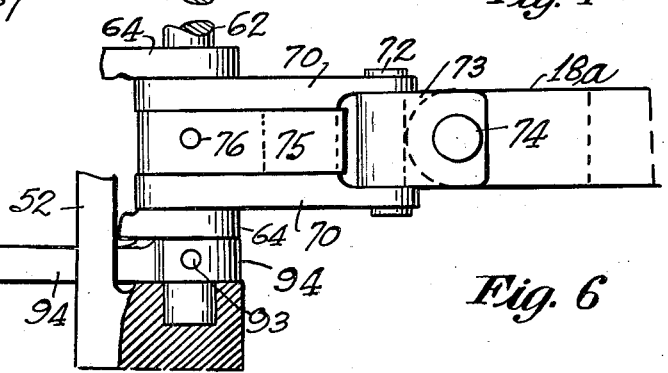
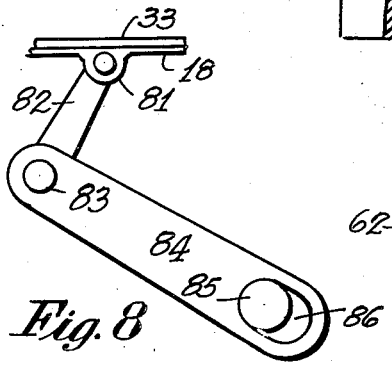
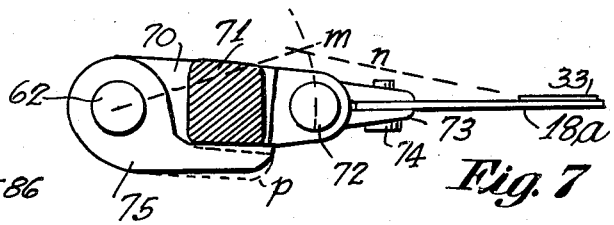
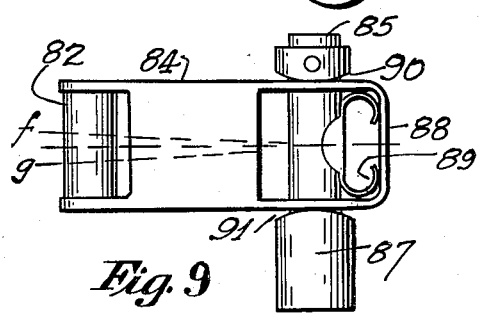
INVENTOR
Matthew H. Loughridge

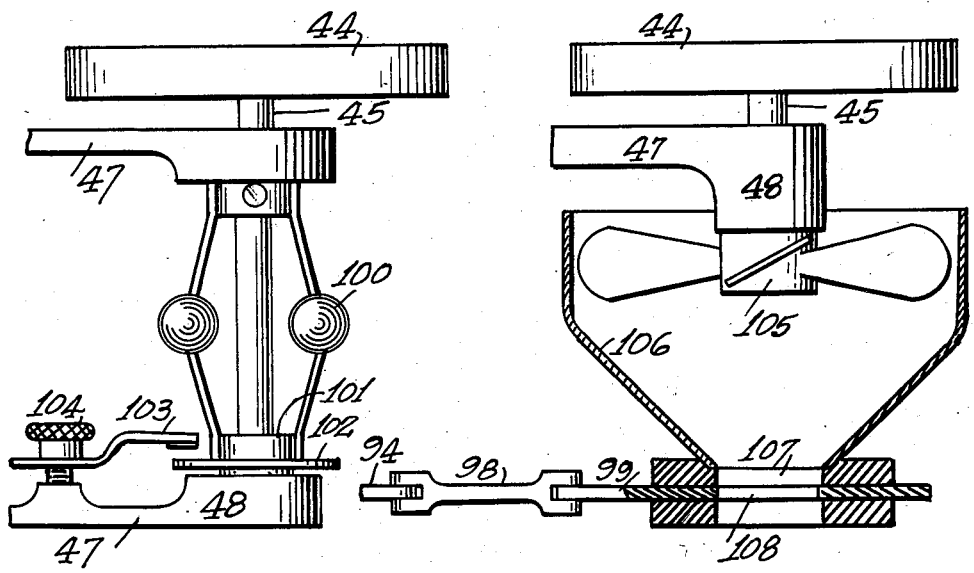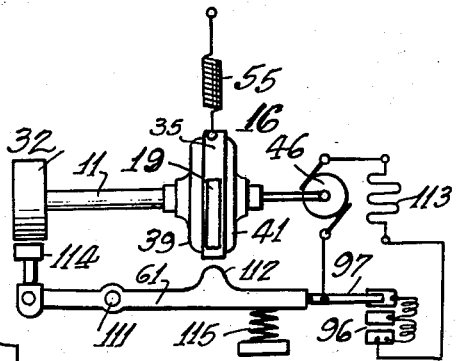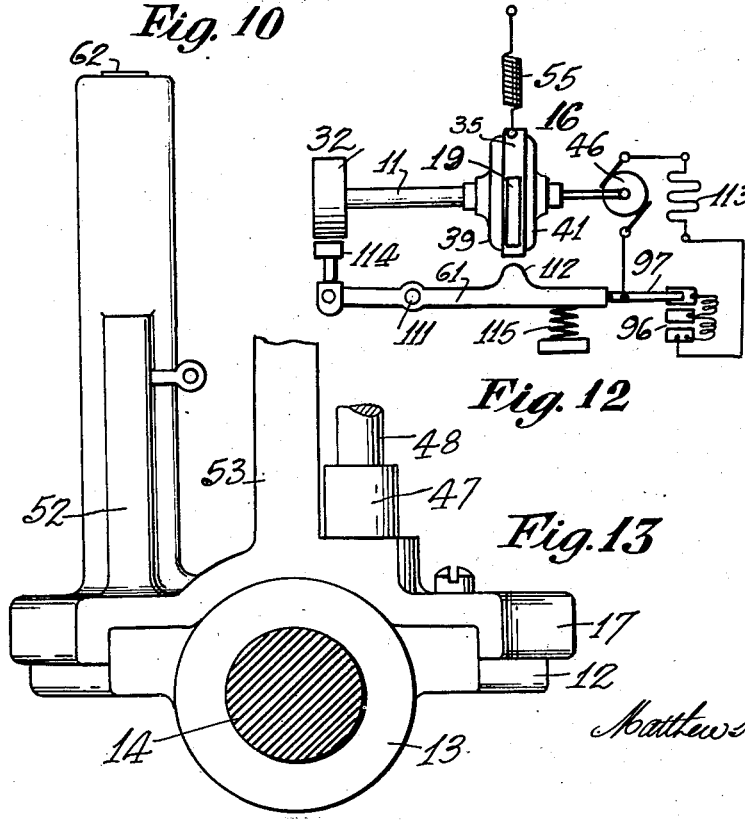

Patented June 7, 1938

2,119,550

UNITED STATES PATENT OFFICE 2,119,550

SPEED CONTROL AND BRAKING SYSTEM

Matthew H. Loughridge, Bogota, N. J.

Application July 19, 1934, Serial No. 736,052

42 Claims. (Cl. 188—180)

This invention relates to braking systems and to speed control systems, and it has for an object to provide a braking or retarding effect when a predetermined speed is exceeded. A further object of the invention is to obtain speed control by a differential mechanism which is operated in part by the driving mechanism. Another object of the invention is to provide a band brake for a brake drum with self-adjusting features to provide for misalignment between the axis of the brake drum and the fixed end of the brake band. A further object of the invention is to provide a differential mechanism for speed control purposes which is operated by but which is not incorporated in the main driving members. Other objects of the invention are more fully set forth in the following specification describing one form of the system and its mode of operation and which will be particularly understood from the accompanying drawings, in which:

Fig. 4 is a detail in elevation showing the support for the brake band and the method for applying tension thereto;

Fig. 5 is an elevation of a link used in Fig. 4 taken at right angles to Fig. 4 from the left;

Fig. 6 is another detail of the end connection for the brake band and the method of applying tension thereto;

Fig. 7 is a plan view, partly sectioned, of the brake band connection shown in Fig. 6;

Fig. 8 is a plan view of a supporting bracket for the brake band;

Fig. 9 is a side elevation of the self centering bracket shown in Fig. 8 for supporting the brake band;

Fig. 10 is an alternative form of retarding mechanism used with Fig. 1 in which a centrifuge is used to determine the predetermined speed;

Fig. 11 is another form of retarding device, partly sectioned, in which the retardation is obtained by an air flow through a restricted orifice;

Fig. 12 is a diagram illustrating the theory of operation of the system when an electric motor is used as a retarding agent, and, Fig. 13 is a fragmentary end view of the mechanism shown in Fig. 1, showing how the braking mechanism is secured to an existing casting by a suitable base.

This invention embodies the features of the differential brake described in U. S. Patent 1,805,551, May 19, 1931, U. S. Patent 2,010,027, August 6, 1935 and U. S. Patent 2,037,034, April 14, 1935. In the above patent the brakes are controlled by a differential mechanism operated by a difference in speed between the driving and driven parts. In the present application a differential mechanism is used to control the brakes, but the brake application is made effective only when a predetermined speed is exceeded. This result is obtained by operatively connecting one member of the differential mechanism with a retarding device which permits a comparatively free movement of this member below the predetermined speed, and on the other hand, retards this member to cause a brake action when the permissible speed has been exceeded.

The invention as illustrated in Figs. 1 to 13 inclusive is applied to a revolving door mechanism of the type which is illustrated in U. S. Patents 1,536,196, and 1,536,197, May 5, 1925. This mechanism is selected to show the operating principles of the invention because of the restricted space in which the braking apparatus must operate, because the support for the door is movable from the center to the side of the aperture and because the vertical stem of the door is not always perpendicular and the brake band must be self-adjusting to suit these conditions. It should be understood, however, that the braking system and speed control of this invention is of general application in the mechanical arts.

Figure 1:
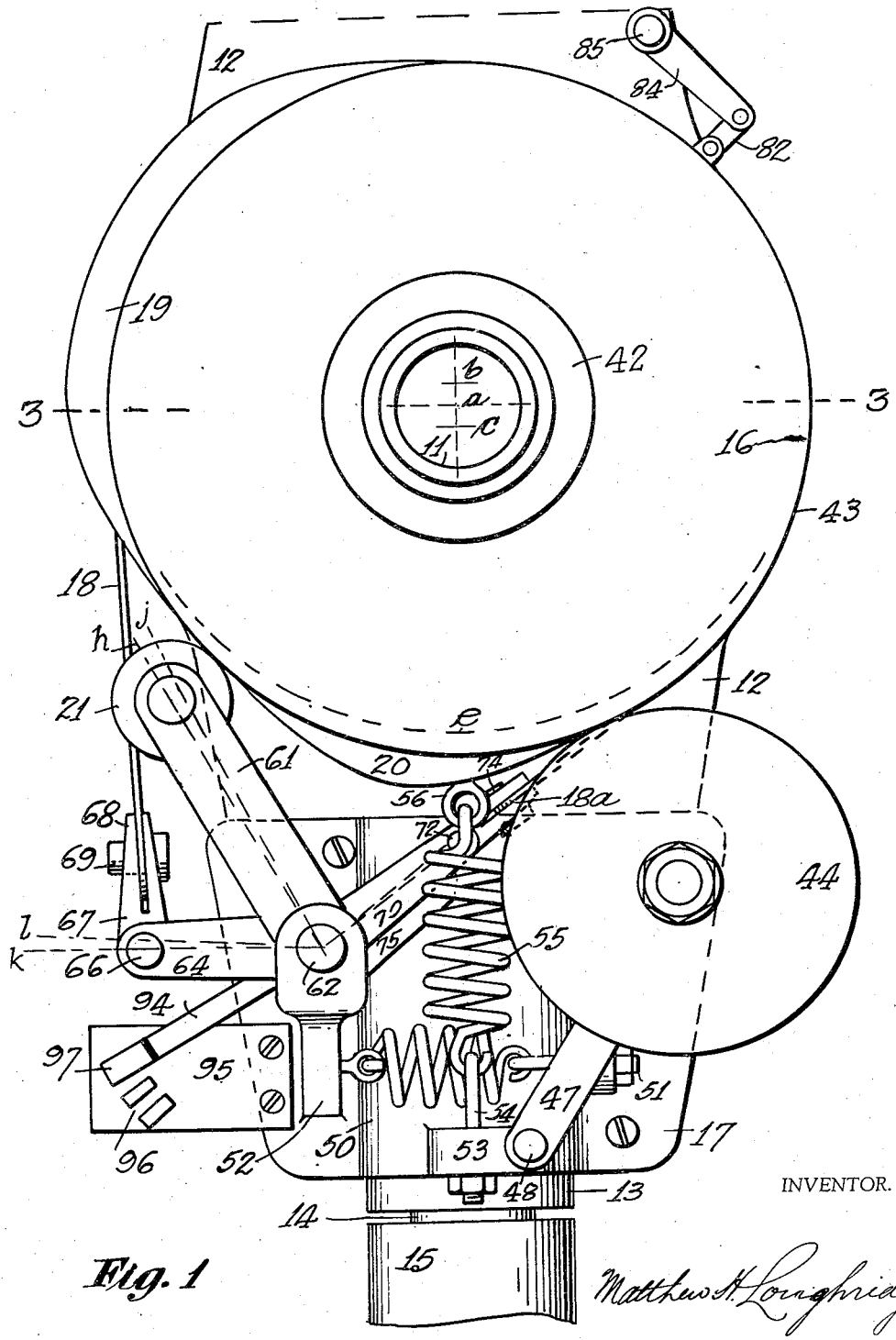
Fig. 1 is a plan view of the speed control mechanism from the top as applied to a revolving door mechanism.

Referring to the drawings, the central stem or shaft of the revolving door is indicated by 11 and carries the wings 24 in the door opening, which is not detailed in the drawings. The shaft 11 passes through an aperture 23 in the cover 22 to the carriage which is mounted above the cover and which is rolled to one side when the wings of the door are collapsed. The carriage or frame is indicated as a whole by the reference numeral 12, which is provided with a socket at 13 engaged by the bearing stud 14, which is supported by the carriage 15. The opposite side of the carriage, not shown in Fig. 1, is correspondingly constructed so that the entire mechanism is free to swing about the stud 14.

The differential mechanism is indicated as a whole by 16 and is mounted on the end of shaft 11, and the base 17, with suitable bearing members formed thereon, is suitably secured to the carriage or frame 12 and supports the mechanism that cooperates with the differential mechanism to operate the brakes. By the construction shown the invention is applied to a well known type of revolving door mechanism without changing the mechanism itself or its mode of operation.

Figure 3:
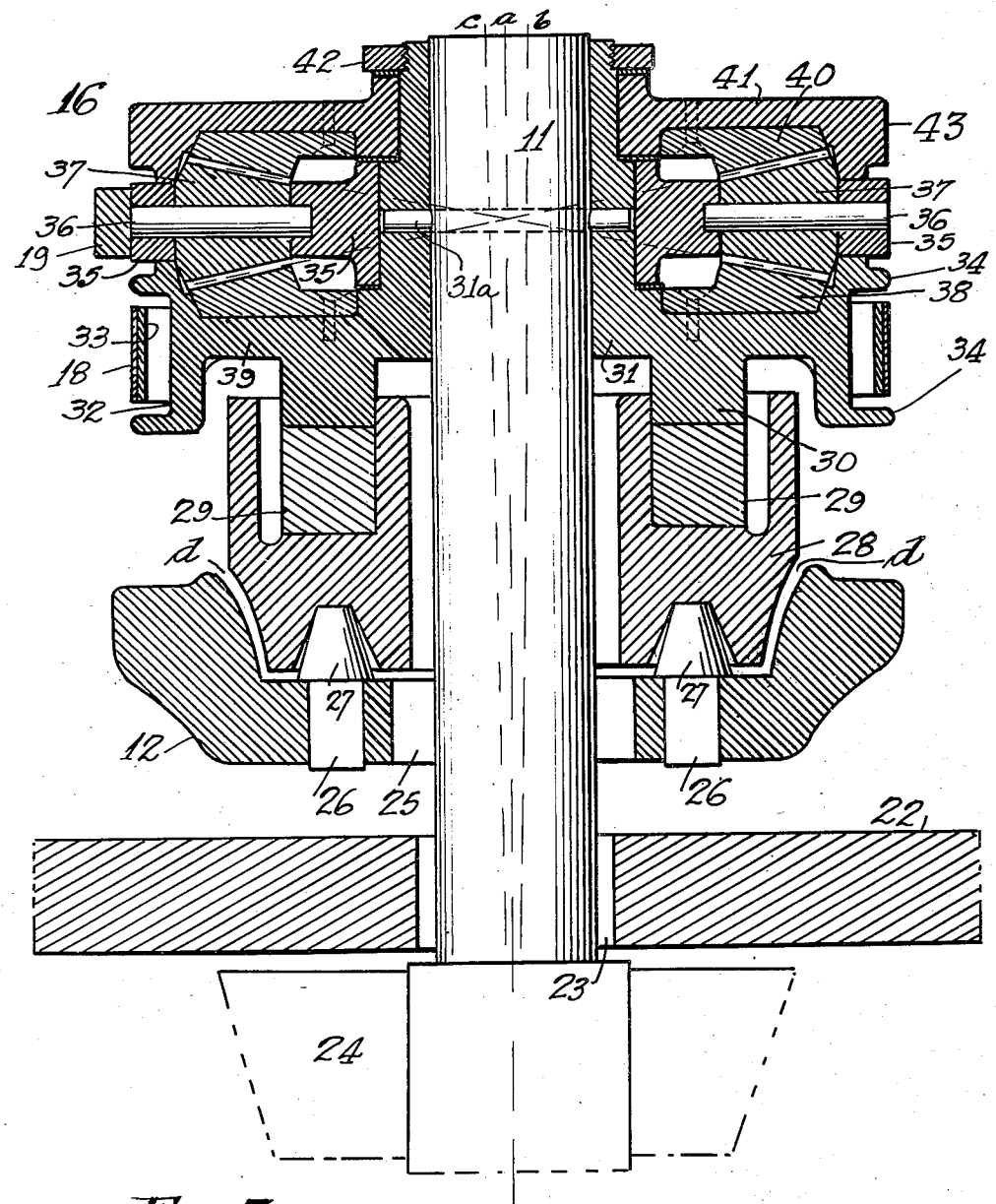
Fig. 3 is a sectional elevation on line 3—3 of Fig. 1 showing the internal construction of the differential mechanism and the brake drum.

By referring to Fig. 3 it will be noted that the carriage 12 through the studs 26 having the conical ends 27 supports the saddle 28, which is provided with a suitable bearing block 29 to support the brake drum member 30 and sleeve 31 which is suitably fitted to the end of shaft 11 to turn therewith, either by a screw or other suitable means, the pin 31a being indicated on the drawings for this purpose. Through the sleeve 31 and member 30 the door is suspended for rotation by the shaft 11. It should be noted that the saddle 28 is free to rock on the studs 14 to the extent of the opening 25 in the carriage 12 and on studs 27 to the extent of the aperture "d" between 28 and 12. This is required due to the fact that the door is moved to one side by pressure on the lower part of shaft 11 which causes this shaft to tilt from the center indicated by the line "a" to the positions indicated by "c" and "b" in a somewhat exaggerated form.

The braking drum 30 has a groove formed at 32 between the ledges 34 for the brake band 18 which is lined with a suitable fabric as indicated at 33 and which engages the drum 32 when the brake is applied. The upper face of the brake drum member is recessed to receive the bevel gear 38 which is suitably secured to 30 by screws or otherwise and engages the pinion gears 37 mounted on the bearing 36 in the planetary member 35 which is mounted upon the sleeve 31. The opposing bevel gear 40 of the differential is mounted in the top member 43 and is suitably secured to the web 41 of this member which in turn is mounted upon the sleeve 31 with the gear 40 engaging the gear 37. A screw collar 42 on the end of the sleeve 31 holds the differential mechanism in place. The planetary member 35 is provided with a cam 19 and another cam 20 which operate the braking system as the planetary member is rotated.

The top member 43 of the differential engages a friction wheel 44 connected with the shaft 45 of the motor 46 carried by the arms 49 of the bearing frame 47 pivotally mounted upon the vertical shaft 48 which is secured to base 17. The bearing frame 47 is forced inwards by the spring 50 connected to the bearing frame 52 at one end and adjustably connected to the swinging frame 47 at 51. This construction maintains the friction wheel 44 in engagement with 43 and causes the rotation of the armature of motor 46 in correspondence with the rotation of 43. A friction drive, as shown, is preferred for this construction, but it is to be understood that where considerable resistance is to be offered to the rotation of 43 spur gears may be preferable to the friction drive.

The planetary member 35 is provided with an eyelet 56 to which the coil spring 55 connects and is adjustably connected to the upstanding arm 53 on the base 17. The purpose of the spring 55 is to normally maintain the planetary member 35 of the differential mechanism in the neutral position and to restore it to a neutral position as the brakes are released by a reduction in speed.

The arm 61, Figs. 1 and 4, is mounted upon the shaft 62 and is keyed to this shaft at 63, the shaft being supported by the bearing 52. The outer end of the arm 61 carries the roller 21 which engages the periphery of the planetary member 35 and rides upon the cams 19 and 20 as this member is moved from the neutral position in either direction. This may be called the cam arm. Another arm 64 is keyed to shaft 62 at 65 and is therefore rotated with shaft 62 as the roller 21 engages the cams. The outer end of arm 64 has a link 67 pivotally connected thereto at 66 and this link is formed with a jaw at 68 to receive one end of the brake band 18 which is pivotally secured to the jaw 68 by the plug 69.

Another link 70 is pivotally mounted on the shaft 62 but is free to rotate on this shaft. This link, at its outer end, has a jaw 73 pivotally connected thereto by the pin 72 and this jaw receives the opposite end 18a of the brake band which is pivotally secured therein by the plug 74. An arm 75 mounted on shaft 62 and secured to rotate therewith by the pin 76 abuts on the central portion 71 of the link 70 so that when the shaft 62 is rotated in a counterclockwise direction, as indicated in Fig. 7, the link 70 is rotated therewith, but if shaft 62 is rotated in a clockwise direction the link 70 is not moved thereby and retains a position tangent to the brake band 18a.

The lower end of the shaft 62 has mounted thereon the arm 94, keyed to this shaft at 93, and carrying at its outer end the insulated contact member 97 moving over the contacts 96 of a rheostat mounted on the plate 95. This rheostat regulates the resistance in the circuit of generator 46.

As the brake band is arranged to engage the horizontal braking drum it may be desirable in certain cases to provide a support for the brake band somewhere near its central section. A support of this kind is indicated in Fig. 1, in which the stem 85 supports the horizontal arm 84 and the link 82 which is attached to the brake band. This mechanism is more fully illustrated in Figs. 8 and 9, in which the base 87 is secured to the carriage 12 and is provided with rounded collars at 90 and 91 engaging the horizontal arm 84 which is provided with slotted apertures 86 for the stem 85. A spring 89, placed between the stem 85 and the rear portion 88 of arm 84, holds this arm normally in the horizontal position but permits it to be deflected above the horizontal to the position indicated by the line "f" and below the horizontal to the position indicated by the line "g" to correspond with the position of the brake drum when tilted. As soon as the brake drum asumes the horizontal position the arm 84 is automatically brought back to this position. The link 82 connects to the brake band at 81 and permits a free movement of the brake band in either direction as well as a deflection from the horizontal.

The operation of the system as described will now be considered with reference to the application and release of the brakes by the differential mechanism, and with relation to the self adjusting features of the brake band when the brake drum is deflected from the perpendicular. The elements of the system will be understood from the diagram in Fig. 12, in which 11 represents the driving shaft provided with a braking drum 32 to be engaged by a brake shoe 114. The shaft 11 connects with one side 39 of the differential mechanism 16 and the opposite side, 41, connects with the retarding motor 46. This motor is provided with a field coil 113 and connects to the rheostat 96. This rheostat has a contact member 97 mounted on, but insulated from, the arm 61 and connected with the opposite side of the motor 46. Thus the movement of arm 97 varies the resistance in the field 113 of the generator 46 which is otherwise short circuited upon itself and sets up a retardation corresponding to its speed and which can be regulated by regulating the resistance of the rheostat.

The planetary member 35 is maintained in the neutral position by a spring 55 and has provided thereon a cam 19 which engages the portion 112 of the lever 61, moving this lever on its pivot 111 against the action of spring 115, thereby bringing the brake shoe 114 into engagement with the brake drum 32 and changing the value of the resistance in the field coil 113. When the shaft 11 is rotated it produces a corresponding rotation of the parts 41 and 35. The planetary member 35 must overcome the tension of spring 55 before it can move from its neutral position, with the result that the driving movement from shaft 11 applied to 39 is taken up by the corresponding reverse movement of member 41 and generator 46. At normal speeds the movement thus applied to generator 46 offers very little retardation to 41 and there is not sufficient torque applied to the planetary member 35 to rotate this member to the brake applying position. As soon, however, as the generator 46 exceeds the normal speed the retardation to 41 is thereby materially increased with the result that the sustained excessive speed of shaft 11 moves the planetary member 35 against the action of spring 55 until the cam 19 engages the roller 21 and thereby causes a brake application and a reduction in speed. This reduces the speed at which the generator 46 has been driven, resulting in reducing its retardation and permitting the spring 55 to restore the planetary member to the neutral position, thus releasing the brake application. The planetary member 35 is provided with the cams 19 and 20, one on each side of the roller 21, so that a braking effect will be obtained when the shaft 11 is rotated at excessive speeds in either direction.

The sensitiveness of the system described can be regulated by regulating the speed of retardation of the generator and by regulating the tension on spring 55. In the application to revolving doors it has been found that speeds up to 12 R. P. M. are entirely safe for most traffic, while speeds of from 15 to 20 R. P. M. are liable to cause accidents and a speed control device of the type described is desirable to prevent these excessive speeds. When the door is started from a position of rest and is quickly accelerated to a speed of 10 or 12 R. P. M. there is the possibility that this quick acceleration will momentarily speed up the generator to the retarding point and cause a partial movement of the planetary member but this partial movement does not result in a brake application as the cams 19 and 20 are so located that the partial movement must be exceeded before these cams become effective in applying the brakes.

The alternative retarding device for the member 43 illustrated in Fig. 10 comprises the centrifuge 100 driven by the friction wheel 44 and having a collar 101 which slides on the shaft 45 and carries the flange 102 into engagement with the brake shoe 103 which is manually adjusted by the screw 104. The arrangement shown in Fig. 11 has the friction wheel 44 driving the air fan 105 in the funnel 106 with the orifice 107.

This orifice is controlled by the slide valve 108, operated by shaft 99 and linked by 98 to the arm 94 which is controlled by the arm 61. As the fan 105 increases its speed it delivers more air to the orifice 107 which sets up a retardation to the fan and this retardation may be further increased by the valve 108 reducing the orifice 107.

From Fig. 1 it will be noted that the shaft 62 which supports the arms carrying the brake band 18 is fixed with relation to the base 17 and the carriage 12, while the brake drum may be deflected to have its center corresponding with the position "b" or "c". If it is assumed that the center of the brake drum is deflected to the position "b", then the periphery will correspond with the dotted line "e". This permits the roller 21 to move towards the center to engage the line "e" and moves the center of the arm 61 from the position indicated by line "h" to the position indicated by the line "j", and in turn the shaft 62 is rotated so as to bring the center of arm 64 from the position indicated by line "k" to the position indicated by line "l". At the same time the arm 75, Fig. 7, is moved to the position indicated in dotted outline at "p" while the link 70 remains tangent to the end 18a of the brake band. The result is that by moving the center of the brake drum away from the shaft 62, the brake band has been correspondingly shifted through the movement of the arm 64 to compensate for this change in centers. The brakes may be operated under these new conditions but the lost motion between 75 and 70 must be taken up before a pull is applied to the end 18a of the brake band.

If the brake drum center is shifted to the position "c" the roller 21 will be moved outwards from the center and the arm 64 will be correspondingly moved in a counter-clockwise direction about the shaft 62 thereby taking up the slack in the brake band. The normal operation of the link 70 in the brake applying position is indicated by the line "m" moving the brake band 18a into position corresponding with line "n" Fig. 7. When the arm 61 is moved in a counter-clockwise direction there is a movement of the arm 75 towards the position "m" which helps to take up the slack in the brake band due to the braking drum being centered at "c".

It will be observed that the channel 32 of the brake drum is comparatively deep and permits a reasonable amount of slack to exist in the brake band so that small variations between the centers "a" and 62 can be compensated for in this way. It is also to be noted that where the brake band is applied with a pull at one end only such as through the arm 64 the end 18a may be secured to a fixed member on the base 17 instead of the link 70. The ends of the brake band are rounded where they fit into the connecting jaws as indicated at 73, Fig. 6, so that the band itself may pivot about the attaching plugs 69 and 74.

The differential mechanism, Fig. 1, fits directly upon the shaft of the door and comes within the clearance of the carriage which supports the door. The gears 38 and 40 are shown as made separately from the supporting castings as these gears can be purchased from commercial stock. The cup shaped form of the lower gear 38 and the supporting drum form an oil reservoir for lubricating the mechanism.

When applied to a revolving door of the type shown in the patents referred to, the bearing 15 for the pivoted frame 12 is mounted on a carriage which rolls the door and the mechanism to one side of the door aperture and this invention particularly facilitates this operation. The braking drum and the gears are centered on the door shaft and come substantially within the clearance of the trackway, as indicated at 20 in Patent 1,536,197. The control mechanism supported by the base 17 also comes substantially within the clearance of the trackway. It should be understood that the bearing members are applied through base 17 when the apparatus is applied to an existing carriage, otherwise these members may be formed from the stock of the frame 12.

The braking effect is obtained by applying tension to the brake band to move it relative to the drum rotating about the door axis. The braking is thus applied direct to the door shaft and is not transmitted through gearing and there are no moving parts within the drum for affecting the braking. The drive of the control mechanism, through the frame 47 and friction wheel 44 adapts itself to the displacement of the door shaft in any direction.

The invention is shown applied with a differential gear of the well known commercial type. It should be understood however that the invention can be applied with different forms of differential gears which have a planetary member, and it may be applied with a differential gear of the hydraulic type in which a fluid is forced between the members of the hydraulic mechanism through the differential member without the use of spur gears.

It should be understood that the function of the driving member, the driven member and the planetary member of the differential mechanism may be interchanged. For instance the top member 43 may be regarded as the planetary and if this member is held in a neutral position the middle member 35 will rotate with the driving member 30.

Figure 2:
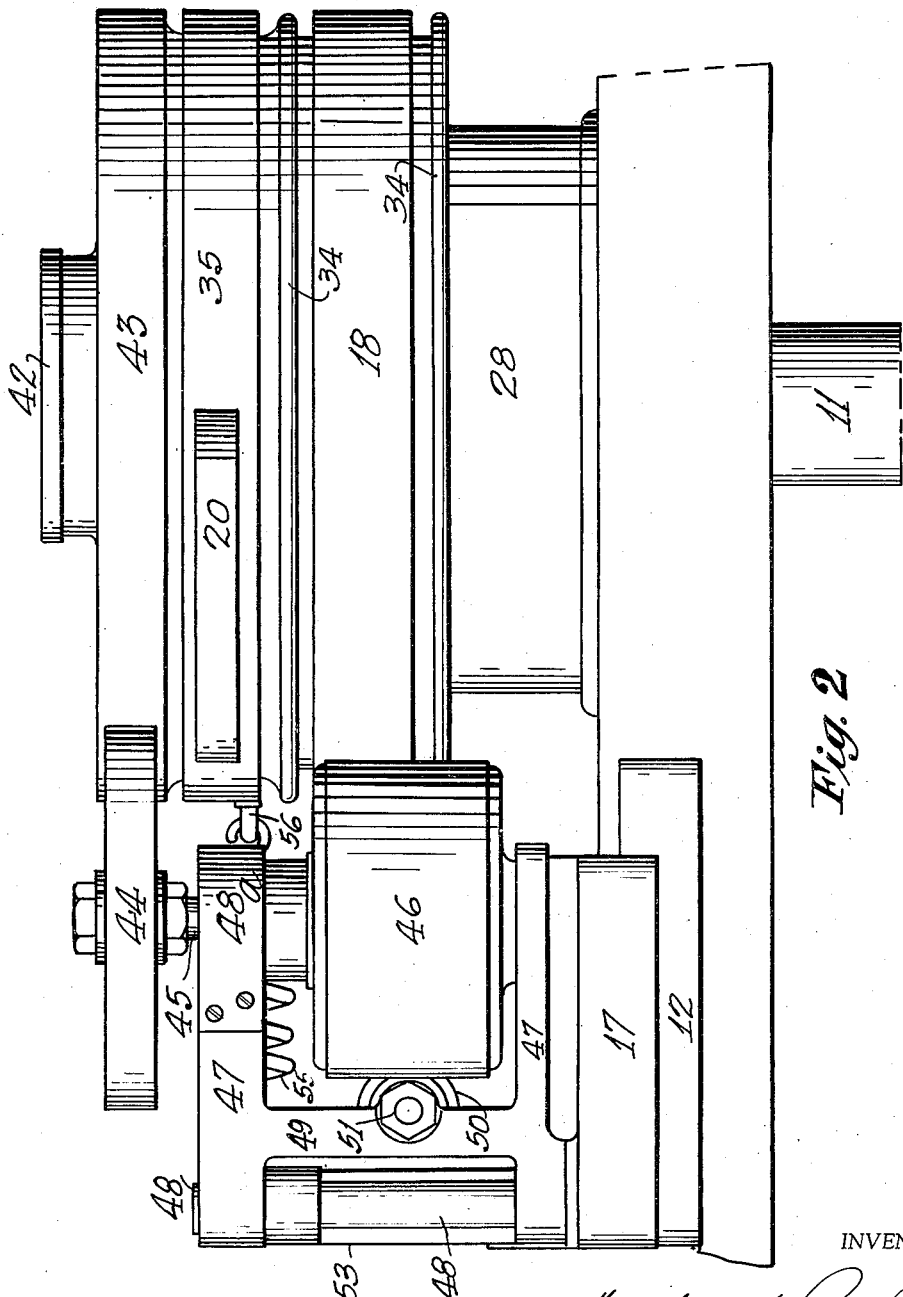
Fig. 2 is a side elevation from the right of the mechanism shown in Fig. 1.

The operation of the mechanism in Figs. 1, 2 and 3 will be understood from the description of Fig. 12 in which, retarding 43 causes the planetary member 35 to be rotated until 19 engages roller 21 and applies tension to the brake band 18 to apply the brakes and reduce the speed. The speed reduction lessens the retardation and enables 43 to rotate at the same speed as 32, or at a greater speed if the spring 55 restores the planetary member to the released position thereby releasing the brakes and restoring normal conditions. If a brake application has been made the member 43 must be rotated in the reverse direction at a greater speed than the shaft 11 to release the application. This tends to dampen the speed of shaft 11.

It should be noted from the operation of the system that the power for operating the brakes is derived from the driving shaft 11, and that the braking effect is produced by retarding the driven member 43, with relation to the driving member 38.

In this construction it will be observed that the braking system is self-contained at the end of the vertical shaft. The brake drum overlaps and partially encloses the braking member 28 thereby saving vertical space. The drum, the controlling cam and the speed control member 43 are all mounted to revolve about the centre of the shaft. The mechanism, apart from the levers for tensioning the brake band and the speed control device is mounted on the shaft.

The speed control member 43 operates the comparatively light speed control device 44 at an increased speed, and the mechanical retardation between the device and the speed control member causes the cam to operate the brake. The extent of this retardation is regulated by the rheostat 96 when the electrical control is used; by the brake 102, 103 when the centrifuge is used and by the valve 108 when the air flow device 105 is used.

The power for operating the brakes is derived from the shaft to be braked and is applied by a cam mounted on this shaft and operated by the retarding device.

The brake band is held in alignment by a self-centering device having a free motion in two directions at right angles to each other and having a bias to bring the band to the centre of the groove in the drum, but without impeding the movement of the band around the drum.

The ends of the brake band are connected to a three way crank, the operating end of which engages the operating cam. Each end of the brake band is connected to one arm of the crank by a universal connection in which the band may move relative to the crank arm in two planes at right angles to each other. One of the crank arms is connected with the operating end of the crank by a lost motion so that motion is not imparted to the brake band by an initial movement of the operating end.

The brake band is maintained in operative relation to the brake drum although the axis of the drum may shift while the axis of the crank operating the brake band remains fixed. The tension on the brake band is self adjusting under these conditions.

Having thus described my invention, I claim:

1. A braking system comprising a rotating brake drum having a sleeve rotating with the drum, a brake band for said drum, means for applying a pull to said brake band and a cam mounted upon said sleeve and rotatable about the same axis as said brake drum for controlling said means.

2. A braking system comprising a supporting frame, a rotating brake drum mounted on said frame, a brake band for said drum, means including a supporting member pivoted to said frame for operating said brake band to apply and release the brakes, and a cam rotatable about the axis of said drum for controlling said means, the distance between said supporting member and the axis of said drum being variable.

3. A braking system comprising a horizontally disposed rotating brake drum, a brake band for said drum, a pivoted arm, a link having a jaw at one end pivoted to said arm with a pivot parallel to the axis of the drum at the other end, a second pivot connecting the end of the brake band with said jaw, said second pivot being at right angles to the axis of the drum and permitting a free movement of the brake in the direction of the drum axis.

4. A braking system comprising a supporting frame, a rotating brake drum mounted on said frame, a brake band for said drum, means including a supporting member pivoted on said frame for operating said brake band, the distance between said member and the axis of said brake drum being variable, and means for automatically adjusting said brake band to said variable distances.

5. A braking system comprising a rotating brake drum, a brake band for said drum, means including a supporting member for operating said brake band connected to the ends of said band, and pivoted self centering means supporting said band intermediate its ends.

6. A braking system comprising a horizontal rotating brake drum, a brake band for said drum, means for operating said brake band to apply and release the brakes including pivotal connections for the ends of said brake band, said pivots being at right angles to the axis of said drum, and self centering means supporting said brake band intermediate its ends.

7. A braking system comprising a differential mechanism having a driving and a driven member connected by a planetary member, a braking mechanism operated by the planetary member as it is moved from a neutral position, yieldable means for normally maintaining said planetary member in the neutral position and means independent of said mechanism for retarding the driven member to cause movement of the planetary member.

8. A braking system comprising a differential mechanism having a driving and a driven member connected by a planetary member, a braking mechanism operated by the planetary member as it is moved from a neutral position, yieldable means for normally maintaining said planetary member in the neutral position, a retarding member independent of said mechanism for retarding the driven member and means for automatically regulating the retardation of said retarding member.

9. A braking system comprising a differential mechanism having a driving and a driven member connected by a planetary member, a braking mechanism operated by the planetary member as it is moved from a neutral position, a spring normally moving said planetary member to a neutral position and means independent of said mechanism for retarding said driven member to overcome said spring and move said planetary member to the operating position.

10. A braking system comprising a driving shaft, a braking drum and a driving member of a differential mechanism mounted to rotate with said shaft, said differential mechanism comprising a planetary member and a driven member connected with said driving member by said planetary member, means independent of said mechanism for retarding said driven member to cause movement of said planetary member, and braking means for said drum operated by said planetary member.

11. A braking system comprising a differential mechanism having a driving and a driven member connected by a planetary member, a braking mechanism operated by the planetary member as it is moved from a neutral position, yieldable means for normally maintaining said planetary member in the neutral position, and means independent of said mechanism engaging said driven member by friction for retarding its movement to cause movement of the planetary member.

12. A speed control system comprising a driving shaft, a differential mechanism having one member connected with said shaft, a planetary member biased to a neutral position, a driven member operatively connected with the first member by said planetary member, a braking mechanism operatively connected with said planetary member and a speed limiting device connected with said driven member to cause movement of the planetary member when a predetermined speed is exceeded.

13. A speed control system comprising a driving shaft, a differential mechanism having one member connected with said shaft, a planetary member biased to a neutral position, a driven member operatively connected with the first member by said planetary member, and a speed limiting device connected with said driven member to prevent its speed corresponding with the speed of the driving shaft to cause movement of the planetary member and effecting a brake operation.

14. A speed control system comprising a driving shaft, a differential mechanism having one member connected with said shaft, a planetary member biased to a neutral position, a driven member operatively connected with the first member by said planetary member, a braking mechanism operatively connected with said planetary member, and an electric generator connected with said driven member to retard said member and cause movement of the planetary member to the brake operating position.

15. A speed control system comprising a driving shaft, a differential mechanism having one member connected with said shaft, a planetary member biased to a neutral position, a driven member operatively connected with the first member by said planetary member, a braking mechanism operatively connected with said planetary member and an electric generator connected with said driven member to retard said member to cause movement of said planetary member to the brake operating position, said planetary member controlling the circuit of said generator.

16. A braking system comprising a brake drum, a brake band for said drum, a cam for operating said brake band, a member pivoted on the same centre as the brake drum for operating said cam and a device engaging said member by friction for operating said member to operate the cam.

17. A braking system comprising a brake drum, a brake band for said drum, a cam for operating said brake band, a member pivoted on the same centre as the brake drum for operating said cam and a rotating device engaging said member to affect its movement and means for regulating the movement of said device.

18. A braking system comprising a brake drum, a brake band for said drum, a cam for operating said brake band, a member pivoted on the same centre as the brake drum for operating said cam and a retarding device engaging said member to affect its movement and means for varying the retardation of said device as the degree of braking is varied.

19. A braking system comprising a brake drum, a brake band for said drum, a cam for operating said brake band, a member pivoted on the same centre as the brake drum for operating said cam and a retarding device operated by the movement of the drum and co-operating with the cam for applying the brakes.

20. A braking mechanism comprising a rotating member, a brake drum, a brake band for said drum, a cam for operating said brake band, a spring controlled arm supporting a member in engagement with said rotating member by friction and means for operating said cam by said arm supported member.

21. A braking mechanism for a vertical shaft comprising a differential mechanism having a planetary member mounted on the shaft, one member of said differential mechanism rotating with the shaft and having a braking surface, a braking shoe for said braking surface, said planetary member having a cam formed thereon and means operating said brake shoe by said cam, said differential mechanism having another member for operating said planetary member.

22. A braking mechanism for a vertical shaft comprising a differential mechanism having a member with a sleeve mounted to rotate with the shaft and having a braking surface, a planetary member and another member freely mounted on said sleeve, a braking shoe for said braking surface, said planetary member having a cam formed thereon and means operating said brake shoe by said cam and a device regulated by speed operatively engaging said other member to cause movement of said planetary member.

23. A braking mechanism for a vertical shaft comprising a bearing for the shaft, a braking drum mounted to rotate with the shaft, said drum being larger than the bearing and partially enclosing the bearing, said drum forming one side of a differential mechanism comprising a planetary member having a cam formed thereon and another side, a brake shoe for said drum operated by said cam and means for controlling the other side of the differential mechanism to control the brakes.

24. A braking mechanism for a shaft comprising a differential mechanism having one member rotating with the shaft and formed in a braking drum, a planetary member and a second member rotating on the same axis as said shaft, a brake band for said drum, means for operating said brake band by said planetary member and means controlling said second member to control the brake.

25. A braking mechanism for a revolving door comprising a carriage, a shaft for the door having a bearing on said carriage, a brake drum on the end of said shaft, a brake band for said drum, operating connections for said brake band pivoted on said carriage and means responsive to speed for operating said brake band.

26. A braking mechanism for a revolving door comprising a vertical shaft for the door, a horizontally disposed brake drum on said shaft, a horizontally disposed brake band for said drum, means responsive to speed for operating said brake band and a horizontally swinging arm connected to said brake band, intermediate its ends, for centering said brake band on the drum.

27. A braking mechanism comprising a brake drum, a brake band for said drum, a three arm crank having one arm connected to one end of the brake band and another arm connected to the other end of the brake band and means associated with the third arm for operating the other two arms to apply the brake, one of the arms connected with the brake band being connected with the operating arm through a lost motion connection.

28. A braking mechanism comprising a horizontal brake drum, a horizontally disposed brake band engaging said brake drum, a horizontally disposed crank for operating said brake band, having a pair of arms, a link pivoted to each of said arms by a vertical pivot and each end of the brake band pivotally connected to each link by a horizontal pivot.

29. A braking system comprising a braking drum, a brake band for said drum, means for applying tension to the ends of said brake band to apply the brakes and a support for said brake band intermediate its ends, said support comprising a member mounted to move at right angles to the axis of the drum and being free to move with the brake band on the periphery of the drum.

30. A braking system comprising a brake drum, a brake band for said drum, means for applying tension to the ends of said brake band to apply the brakes and a support for said brake band intermediate its ends, said support comprising a member normally swinging in the plane of the brake drum but having a free movement at right angles thereto and having a bias to bring it to the normal position.

31. A braking system comprising a differential mechanism having a planetary member with a member on each side thereof, a shaft to be braked, said differential mechanism mounted on said shaft and one of said members rotating with said shaft, said planetary member being mounted for rotation free of said shaft, a spring operatively connected with said planetary member to hold it in a normal position, a brake shoe, means for bringing said brake shoe into the braking position by said planetary member as said member is moved from the normal position, the brake operation being controlled by the other member of the differential mechanism.

32. A braking system comprising a differential mechanism having a driving and a driven member connected by a planetary member, a braking mechanism operated by the movement of said planetary member, means for maintaining said planetary member in a neutral postion and a centrifuge operated brake for retarding said driven member to cause movement of the planetary member.

33. A braking system comprising a differential mechanism having a driving and a driven member connected by a planetary member, a braking mechanism operated by the movement of said planetary member, means for maintaining said planetary member in a neutral position and an air fan for retarding said driven member to cause movement of the planetary member.

34. A braking system comprising a differential mechanism having a driving and a driven mechanism connected by a planetary member, a braking mechanism operated by the movement of said planetary member, means for maintaining said planetary member in a neutral position, means associated with an air flow for retarding said driven member to cause movement of the planetary member and means for controlling said air flow.

35. A support for a brake band on a brake drum comprising a fixed stem, an arm pivotally mounted on said stem through a slotted aperture, a spring normally holding said arm in a predetermined position and a link pivotally connecting said arm with the brake band, said link being mounted to move freely on said arm with the longitudinal movement of the brake band and being held rigid by said arm to resist the transverse movement of the band.

36. A braking system for a revolving door comprising a vertical shaft supporting and revolving with the door, a horizontally disposed braking drum on the end of said shaft, a brake shoe for said drum and a cam operating about the axis of said shaft controlling said brake band to apply and release the brakes.

37. A braking system for a revolving door comprising a vertical shaft supporting and revolving with the door, a differential mechanism having a planetary member mounted on the axis of said shaft, a braking mechanism operated by said planetary member and means for operating said differential mechanism to apply the brake when a predetermined speed is exceeded.

38. A braking system comprising a differential mechanism having a driving and a driven member connected by a planetary member, a braking mechanism operated by the movement of said planetary member, means for maintaining said planetary member in a neutral position, an electric generator connected with said driven member to retard said member and cause movement of the planetary member and means controlling the circuit of said generator by said planetary member.

39. A braking mechanism for a revolving door comprising a carriage, a shaft for the door having a bearing in said carriage, a brake drum on said shaft, a shoe pivotally mounted on said carriage engaging said brake drum, a member pivotally mounted on said shaft and means associated with said member for applying said brake shoe to the drum when the speed of rotation of the door exceeds the speed of said pivoted member.

40. A braking mechanism for a revolving door comprising a carriage, a shaft for the door having a bearing in said carriage, a brake drum on said shaft, a shoe pivotally mounted on said carriage engaging said brake drum and means responsive to the speed of said shaft for applying said brake shoe to said brake drum.

41. An article of manufacture comprising a differential mechanism having a driven element and a driving element and a planetary member pivotally mounted on the same axis, said planetary member having a gear connecting said elements and a spring connected with said planetary member to move it to a biased position and a cam on said planetary member.

42. An article of manufacture comprising a differential mechanism having a planetary member and a pair of members connected therewith through a floating connection, said planetary member being pivotally mounted and yieldable means connected with said planetary member to place it in a biased position and a cam on one of said members.

MATTHEW H. LOUGHRIDGE.